United States Patent
Stanley et al.

(10) Patent No.: US 6,290,255 B1
(45) Date of Patent: Sep. 18, 2001

(54) OCCUPANT DETECTION SYSTEM

(75) Inventors: James Gregory Stanley, Novi; Robert Anthony Stopper, Jr., Plymouth, both of MI (US)

(73) Assignee: Automotive Systems Laboratory, Inc., Farmington Hills, MI (US)

(*) Notice: Subject to any disclaimer, the term of this patent is extended or adjusted under 35 U.S.C. 154(b) by 0 days.

(21) Appl. No.: 09/294,680

(22) Filed: Apr. 19, 1999

Related U.S. Application Data

(60) Provisional application No. 60/082,517, filed on Apr. 21, 1998, provisional application No. 60/082,408, filed on Apr. 20, 1998, provisional application No. 60/082,443, filed on Apr. 20, 1998, provisional application No. 60/082,528, filed on Apr. 21, 1998, provisional application No. 60/082,523, filed on Apr. 21, 1998, provisional application No. 60/119,694, filed on Feb. 11, 1999, and provisional application No. 60/038,620, filed on Mar. 7, 1997.

(51) Int. Cl.[7] .................................................. B60R 21/32
(52) U.S. Cl. ........................... 280/735; 180/271; 701/45
(58) Field of Search ..................................... 280/734, 735; 701/45; 307/10.1; 180/271; 342/72

(56) References Cited

U.S. PATENT DOCUMENTS

| | | | |
|---|---|---|---|
| 3,672,699 | 6/1972 | De Windt | 280/150 AB |
| 3,740,567 | 6/1973 | Atkins | 307/10 SB |
| 3,767,002 | 10/1973 | Gillund | 180/102 |
| 3,898,472 | 8/1975 | Long | 307/10 SB |
| 4,300,116 | 11/1981 | Stahovec | 340/32 |
| 4,625,329 | 11/1986 | Ishikawa et al. | 382/1 |
| 4,796,013 | 1/1989 | Yasuda et al. | 340/562 |
| 4,831,279 | 5/1989 | Ingrham | 307/116 |
| 4,980,519 | 12/1990 | Mathews | 178/19 |
| 5,071,160 | 12/1991 | White et al. | 280/735 |
| 5,074,583 | 12/1991 | Fujita et al. | 280/735 |
| 5,118,134 | 6/1992 | Mattes et al. | 280/735 |

(List continued on next page.)

OTHER PUBLICATIONS

Lawrence Livermore Labs; "Micropower Impulse Radar (MIR)", from http://lasers.llnl.gov/lasters/idp/mir/files/MIR_info.html (printed on Apr. 17, 1998).

Smith, J.R.; "Field Mice: Extracting hand geometry from electric field measurements", IBM Systems Journal, vol. 35. Nos. 3&4, 1996.

Fink, Donald G. and Beaty, H. W.; Standard Hand book for Electrical Engineers 12th ed., McGraw–Hill, 1987, pp. 3–57 through 3–65.

Primary Examiner—Daniel G. DePumpo
Assistant Examiner—Christopher Bottorff
(74) Attorney, Agent, or Firm—Dinnin & Dunn P.C.

(57) ABSTRACT

An occupant detection system (10) for controlling the activation of an air bag inflator module (16) incorporates radar module (12), the activation of which is responsive to an activation sensor responsive to either the likelihood of a crash or to the likelihood of injury from the air bag inflator module (16) as a result of proximity thereto. In one embodiment, responsive to a potential crash, the air bag inflator module activates the radar module (12) for a period of time to sense if an occupant is within the at-risk zone of the air bag inflator module. In another embodiment, the activation of the radar module (12) is responsive to a continuously active range/proximity sensor (22). The air bag inflator is disabled if an occupant is detected with in the at-risk zone of the air bag inflator module (16).

6 Claims, 6 Drawing Sheets

U.S. PATENT DOCUMENTS

| | | | |
|---|---|---|---|
| 5,161,820 | 11/1992 | Vollmer | 280/730 |
| 5,205,582 | 4/1993 | Shiga et al. | 280/735 |
| 5,214,388 | 5/1993 | Vranish et al. | 324/683 |
| 5,232,243 | 8/1993 | Blackburn et al. | 280/732 |
| 5,247,261 | 9/1993 | Gershenfeld | 324/716 |
| 5,330,226 | 7/1994 | Gentry et al. | 280/735 |
| 5,366,241 | 11/1994 | Kithill | 280/735 |
| 5,398,185 | 3/1995 | Omura | 364/424.05 |
| 5,404,128 | 4/1995 | Ogino et al. | 340/425.5 |
| 5,411,289 | 5/1995 | Smith et al. | 280/735 |
| 5,413,378 | 5/1995 | Steffens, Jr. et al. | 280/735 |
| 5,439,249 | 8/1995 | Steffens, Jr. et al. | 280/735 |
| 5,446,661 | 8/1995 | Gioutsos et al. | 364/424.05 |
| 5,454,591 | 10/1995 | Mazur et al. | 280/735 |
| 5,474,327 | 12/1995 | Schousek | 280/735 |
| 5,482,314 | 1/1996 | Corrado et al. | 280/735 |
| 5,490,069 | 2/1996 | Gioutsos et al. | 364/424.05 |
| 5,494,311 | 2/1996 | Blackburn et al. | 280/735 |
| 5,515,933 | 5/1996 | Meyer et al. | 180/273 |
| 5,525,843 | 6/1996 | Howing | 307/9.1 |
| 5,528,698 | 6/1996 | Kamei | 382/100 |
| 5,531,472 | 7/1996 | Semchena et al. | 280/735 |
| 5,549,323 | 8/1996 | Davis | 280/728.3 |
| 5,570,903 | 11/1996 | Meister et al. | 280/735 |
| 5,573,269 | 11/1996 | Gentry et al. | 280/735 |
| 5,589,838 | 12/1996 | McEwan | 342/387 |
| 5,602,734 | 2/1997 | Kithil | 364/424.055 |
| 5,612,876 | 3/1997 | Zeidler et al. | 364/424.055 |
| 5,618,056 | 4/1997 | Schoos et al. | 280/735 |
| 5,624,132 | 4/1997 | Blackburn et al. | 280/735 |
| 5,626,359 | 5/1997 | Steffens, Jr. et al. | 280/735 |
| 5,636,864 | 6/1997 | Hori | 280/735 |
| 5,653,462 | 8/1997 | Breed et al. | 280/735 |
| 5,661,490 | 8/1997 | McEwan | 342/387 |
| 5,691,693 | 11/1997 | Kithil | 340/439 |
| 5,694,320 | 12/1997 | Breed | 364/424.055 |
| 5,702,123 | 12/1997 | Takahashi et al. | 280/735 |
| 5,722,686 * | 3/1998 | Blackburn et al. | 280/735 |
| 5,731,781 | 3/1998 | Reed | 342/135 |
| 5,748,473 | 5/1998 | Breed et al. | 364/424.055 |
| 5,770,997 * | 6/1998 | Kleinberg et al. | |
| 5,782,485 | 7/1998 | Takeda et al. | 280/735 |
| 5,802,479 | 9/1998 | Kithill et al. | 701/45 |
| 5,822,707 | 10/1998 | Breed et al. | 701/49 |
| 5,829,782 | 11/1998 | Breed et al. | 280/735 |
| 5,835,613 | 11/1998 | Breed et al. | 382/100 |
| 5,844,486 | 12/1998 | Kithil et al. | 340/573 |
| 5,845,000 | 12/1998 | Breed et al. | 382/100 |
| 5,848,802 | 12/1998 | Breed et al. | 280/735 |
| 5,871,232 | 2/1999 | White | 280/735 |
| 5,890,085 | 3/1999 | Corrado et al. | 701/47 |
| 5,901,978 | 5/1999 | Breed et al. | 280/735 |
| 5,943,295 | 8/1999 | Varga et al. | 367/99 |
| 5,954,360 | 9/1999 | Griggs, II et al. | 280/735 |
| 5,964,478 | 10/1999 | Stanley et al. | 280/735 |
| 5,983,147 | 11/1999 | Krumm | 701/45 |
| 6,005,958 * | 12/1999 | Farmer et al. | |
| 6,007,095 | 12/1999 | Stanley | 280/735 |
| 6,014,602 | 1/2000 | Kithil et al. | 701/45 |
| 6,018,693 * | 1/2000 | Blackburn et al. | 280/735 |
| 6,027,138 | 2/2000 | Tanaka et al. | 280/735 |
| 6,039,139 | 2/2000 | Breed et al. | 180/271 |
| 6,097,332 * | 8/2000 | Crosby, II | 180/271 |

\* cited by examiner

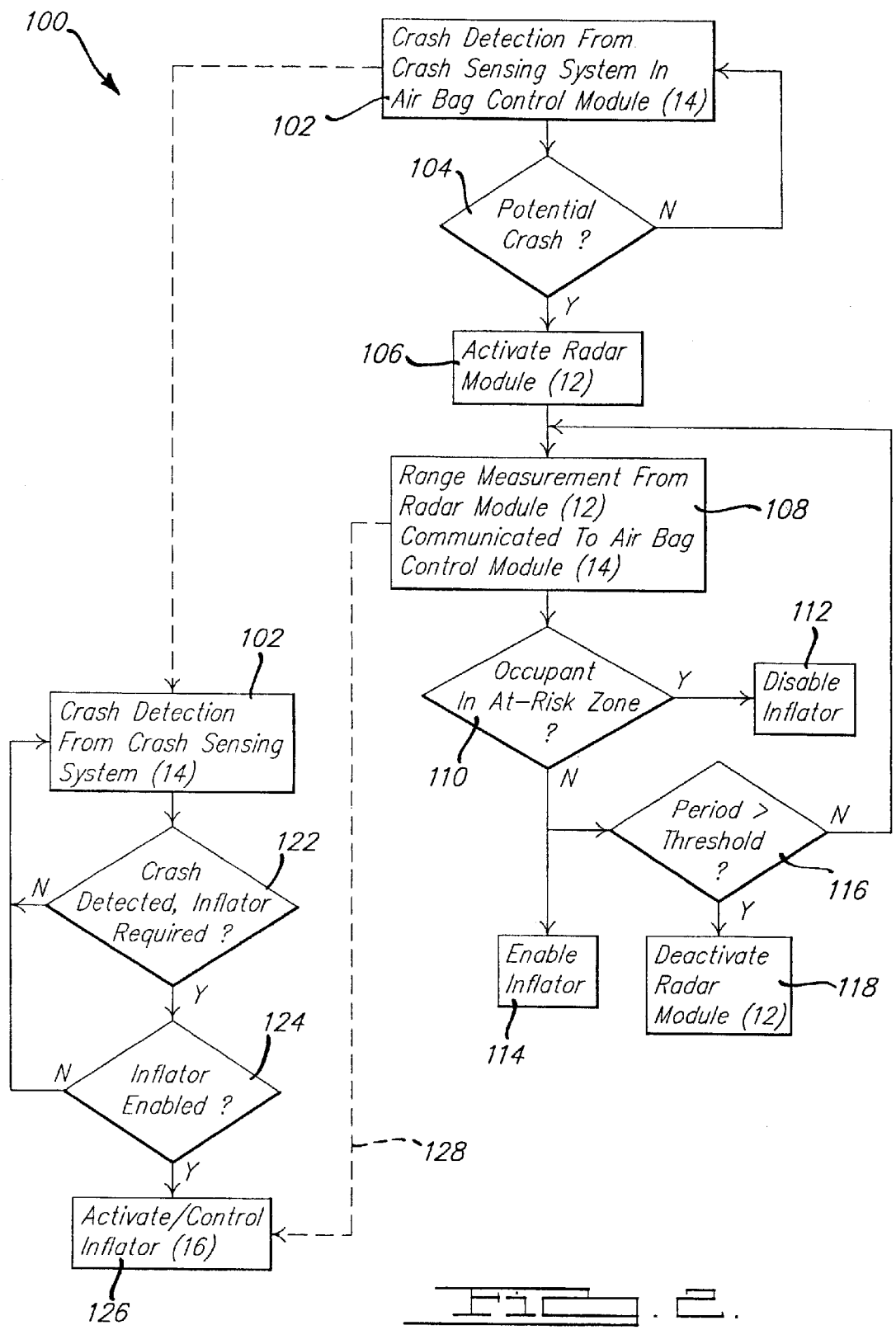

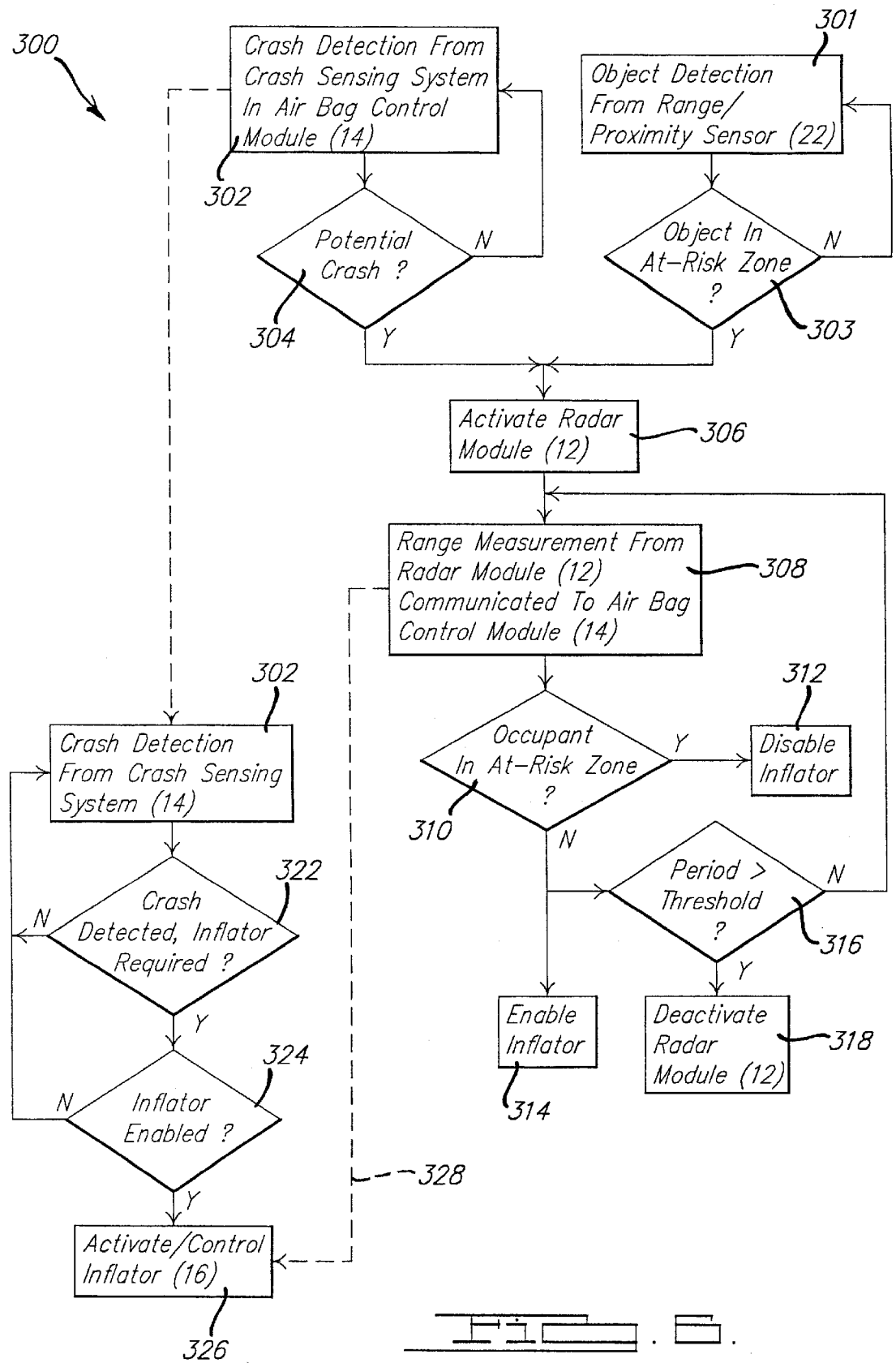

OCCUPANT DETECTION SYSTEM

CROSS-REFERENCE TO RELATED APPLICATIONS

The instant application claims the benefit of prior U.S. Provisional Application Ser. No. 60/082,517 filed on Apr. 21, 1998.

Co-pending, commonly owned U.S. application Ser. No. 09/294,752, entitled "Occupant Detection System", filed on the same date as the instant application, claiming benefit of U.S. Provisional Application Ser. No. 60/082,408 filed on Apr. 20, 1998, claiming benefit of U.S. Provisional Application Ser. No. 60/082,443 filed on Apr. 20, 1998, and claiming benefit of U.S. Provisional Application Ser. No. 60/082,528 filed on Apr. 21, 1998 discloses an occupant detection system comprising a transmitter/receiver subsystem that detects the interaction of an occupant with a beam of wave energy that is disposed in a region that is occupied by a normally seated occupant, and that is not occupied by either an out-of-position occupant or a rear facing infant seat.

Co-pending, commonly owned U.S. application Ser. No. 09/294,675, entitled "Occupant Detection System", filed on the same date as the instant application, claiming benefit of U.S. Provisional Application Ser. No. 60/082,523 filed on Apr. 21, 1998, and claiming benefit of U.S. Provisional Application Ser. No. 60/119,694 filed on Feb. 11, 1999 discloses an occupant detection system comprising a transmitter/receiver subsystem that both measures the distance to a seat and the distance to the front surface of the seat.

Commonly owned U.S. application Ser. No. 08/911,488, entitled "Occupant Position Sensing System", filed on Aug. 14, 1997, now U.S. Pat. No. 5,871,232, discloses and occupant position sensing system comprising a ranging sensor in combination with a capacitive sensor.

Commonly owned U.S. application Ser. No. 08/911,148, entitled "Electric Field Sensing Air Bag Danger Zone Sensor", filed on Aug. 14, 1997 now U.S. Pat. No. 5,964,478 claiming benefit of U.S. Provisional Application Ser. No. 60/038,620 filed on Mar. 7, 1997, discloses a capacitive danger-zone sensor.

Commonly owned U.S. application Ser. No. 08/841,521, entitled "Occupant Position Sensing System", filed on Apr. 23, 1997, now U.S. Pat. No. 6,005,958, discloses a vision-based system for sensing occupant position.

The above-described applications are incorporated herein by reference.

TECHNICAL ART

The instant invention generally relates to occupant detection systems for controlling the activation of vehicular safety restraint systems and more particularly for determining the presence and position of an occupant for purposes of influencing the deployment of a safety restraint system responsive to a crash.

BACKGROUND OF THE INVENTION

A vehicle may contain automatic safety restraint actuators that are activated responsive to a vehicle crash for purposes of mitigating occupant injury. Examples of such automatic safety restraint actuators include air bags, seat belt pretensioners, and deployable knee bolsters. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. For example, unbelted occupants subjected to severe pre-impact braking are particularly vulnerable to being out-of-position at the time of deployment. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Air bags can be beneficial to any forward facing occupant when that occupant is a significant distance from the inflator door. Air bags, however, can be lethal to infants in rear facing infant seats (RFIS). Air bags can also be hazardous to forward facing occupants if they are too close to the inflator at the time of vehicle impact, such as when an unbelted occupant is subjected to severe pre-impact breaking. Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants; to small or frail occupants such as children, small women, or elderly occupants; or to infants in rear facing infant seats (RFIS). While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

Automotive manufacturers and NHTSA are searching for methods to disable air bags in situations where they may cause more harm than good. Airbags have been developed to open with enough force to restrain a 175 lb. adult in a high velocity crash. When these air bags are deployed on children in the front passenger seat of a vehicle, they may cause serious injuries. Another potentially harmful situation is when the occupant is very close to the air bag inflator module at the time of air bag deployment. Recent NHTSA data suggests that severe injuries due to this close proximity with the inflator can be reduced or eliminated if the air bag is disabled when the occupant is closer than approximately four to ten inches from the inflator door. The region proximate to air bag inflator where the occupant could be at risk of injury from the air bag is called the "at-risk" zone. The size of the at-risk zone is dependent upon the inflation characteristics of the associated air bag inflator and the velocity of the occupant with respect to the air bag module. Previous studies had suggested that the at-risk zone extended about eight inches from the inflator door.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants at greater risk for injury when exposed to higher severity crashes.

Another technique for mitigating injury to occupants by the air bag inflator is to control the rate of inflation rate or the capacity of the inflator responsive to a measure of the severity of the crash. The prior art teaches the use of multi-stage inflators having distinct independent compartmentalized stages and corresponding firing circuits, whereby the stages may be fired in delayed succession to control the effective inflation rate, or stages may be inhibited from firing to control the effective inflator capacity. The prior art also teaches the use of a hybrid inflator having a combination of stored gas and plural pyrotechnic gas generator elements which are independently fired. Furthermore, the prior art also teaches the use of control valves for controlling the gaseous discharge flow from the inflator. The inflation rate and capacity may be controlled responsive to the sensed or estimated severity of the crash, whereby a low severity would require a lower inflation rate or inflation capacity than a high severity crash. Since lower severity crashes are more likely than those of higher severity, and since such a controlled inflator would likely be less aggressive under lower severity crash conditions than those of higher severity, occupants at risk of injury by the air bag inflator because of their size or position will be less likely to be injured overall because they are more likely to be exposed to a less aggressive inflator. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the inflator responsive to the presence and position of the occupant, thereby activating the inflator only when an occupant is positioned outside the associated at-risk zone of the inflator. Recent NHTSA data suggests that severe injuries due to close proximity with the inflator can be reduced or eliminated if the air bag is disabled when the occupant is closer than approximately 4 to 10 inches from the inflator door. Such a system for disabling the air bag inflator requires a occupant sensor that is sufficiently sensitive and robust to make such a determination, while not causing the air bag inflator to be disabled when otherwise required for providing occupant restraint.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. The prior art teaches various means for detecting the presence of an occupant, or the recognition of an inanimate object in the passenger-seat of a vehicle for purposes of implementing such a system. For example, weight sensors can incorporated into the seat to detect the presence of an occupant.

Yet another technique for mitigating injury to occupants by the air bag inflator is to control the inflation rate or inflation capacity of the air bag inflator responsive to presence and position of an occupant. Such a control system would most preferentially be used in conjunction with a controllable inflation system responsive to crash severity, such as described above, wherein the occupant position inputs can be used to override otherwise overly aggressive air bag inflator controls which might otherwise be indicated by the particular crash severity level but which could be injurious to occupants of small stature or weight, or to infants in rear facing infant seats. Such a system for controlling the air bag inflator requires an occupant position sensor that is robust and sufficiently accurate, and that can distinguish and discriminate various occupant seating configurations and conditions.

The prior art teaches the use of sensors incorporated into the seat to detect the presence, weight, or seating position of the occupant. U.S. Pat. Nos. 3,672,699, 3,767,002, 5,161, 820, 5,474,327, and 5,612,876 teach the use of occupant presence sensors incorporated into the seat to control the activation of the associated air bag inflator. U.S. Pat. No. 5,205,582 teaches a system for which the air bag inflator associated with an unoccupied seat is activated for accelerations above a second crash deceleration threshold, and otherwise deactivated. U.S. Pat. No. 5,074,583 teaches a plurality of sensors incorporated into the seat to detect occupant weight and seating position for purposes of controlling an air bag system. U.S. Pat. Nos. 5,232,243, 5,494, 311, and 5,624,132 teaches an array of force sensing film elements incorporated into the seat for purposes of detecting the presence, weight, or position of an occupant for controlling either a multi-stage air bag inflator, an inflator vent valve, or the spatial orientation of the air bag inflator. U.S. Pat. No. 5,404,128 teaches the use of a vibration sensor incorporated into the seat to detect the subtle vibrations caused by the breathing and heart rhythms so as to determine whether or not a person is present. U.S. Pat. No. 5,573,269 teaches a means for correcting a seat weight measurement using seat back inclination angle and foot location. For some systems which incorporate seat weight as means for controlling the activation of an air bag inflator, the air bag inflator is required to be disabled if the sensed occupant weight is less than 30 Kg in order to assure that the air bag inflator is enabled for a fifth percentile female, but disabled for an infant in a rear facing infant seat. In some cases, as for example when the seat belt securing the infant seat is pulled too tight, an associated seat weight sensor could sense an apparent weight greater than the associated cut-off threshold so as to incorrectly enable the air bag inflator when a rear facing infant seat is present.

U.S. Pat. Nos. 5,071,160 and 5,118,134 teach the combination of sensing occupant position and/or velocity, and vehicle acceleration for purposes of controlling an inflator. Both of these patents teach by example the use of ultrasonic ranging to sense occupant position. U.S. Pat. No. 5,071,160 also teaches by example the use of a passive infrared occupant position sensor, while U.S. Pat. No. 5,118,134 teaches the use of a microwave sensor. U.S. Pat. No. 5,398,185 teaches the use of a plurality of occupant position sensors in a system for controlling safety restraint actuators in response thereto.

The prior art teaches the use of one or more ultrasonic beams reflected off the surface of an object to sense the location of the surface of the object. U.S. Pat. No. 5,330,226 teaches the combination of an ultrasonic ranging sensor mounted in the instrument panel and an overhead passive infrared sensor to sense occupant position for controlling a multi-stage air bag inflator or a vent valve connected thereto. U.S. Pat. Nos. 5,413,378, 5,439,249, and 5,626,359 teach the combination of ultrasonic sensors mounted in the dash and seat in combination with other seat sensors to detect the position and weight of the occupant for purposes of controlling an air bag inflator module. U.S. Pat. No. 5,482,314 teaches the combination of ultrasonic and passive infrared sensors together with associated signal processing for purposes of determining whether or not to deactivate a passive restraint system. U.S. Pat. Nos. 5,653,462 and 5,829,782 teach system for identifying and monitoring the contents of a passenger compartment by illuminating an object with a wave generator that directs waves towards the vehicle seat, and processing the received signal with a neural network or other pattern recognition system. Furthermore, U.S. Pat. No. 5,653,462 illustrates a system wherein the wave signal is first reflected off the windshield before reaching the vehicle seat.

The prior art also teaches the use of infrared beams reflected off the surface of an object to sense the location of the surface of the object. U.S. Pat. Nos. 5,446,661, and 5,490,069 teach an infrared beam directed by a transmitter at a point of reflection on the object. A receiver detects the radiation scattered from the point of reflection, and measures the distance of the point of reflection from the transmitter based upon a triangulation of the transmitted and received beams for purposes of controlling the activation of a safety restraint system. These patents also teach the combination of an infrared beam occupant position sensor with an acceleration sensor for purposes of controlling an air bag inflation system. U.S. Pat. No. 5,549,323 teaches the incorporation of a light beam occupant sensor into an air bag door. Furthermore, infrared beam sensors are commonly used as range-finders in automatic focusing cameras.

The prior art of U.S. Pat. Nos. 4,625,329, 5,528,698, and 5,531,472 teach the use of imaging systems to detect occupant position, the later two of which use this information for purposes of controlling an air bag inflator. U.S. Pat. Nos. 5,528,698, 5,454,591, 5,515,933, 5,570,903, and 5,618,056 teach various means of detecting the presence of a rear facing infant seat for purposes of disabling an associated air bag inflator.

The prior art also teaches the use of capacitive sensing to detect the presence, proximity, or position of an occupant. U.S. Pat. No. 3,740,567 teaches the use of electrodes incorporated into the base and back of the seat respectively, together with a capacitance responsive circuit, for purposes of discriminating between human occupants and animals or packages resting on an automobile seat. U.S. Pat. No. 3,898,472 teaches an occupant detection apparatus which includes a metallic electrode which is disposed to cooperate with the body of an automobile to form an occupant sensing capacitor, together with related circuitry which senses variations in the associated capacitance responsive to the presence of an occupant. U.S. Pat. No. 4,300,116 teaches the use of a capacitive sensor to detect people proximate the exterior of a vehicle. U.S. Pat. No. 4,796,013 teaches a capacitive occupancy detector wherein the capacitance is sensed between the base of the seat and the roof of the vehicle. U.S. Pat. No. 4,831,279 teaches a capacity responsive control circuit for detecting transient capacitive changes related to the presence of a person. U.S. Pat. Nos. 4,980,519 and 5,214,388 teach the use of an array of capacitive sensors for detecting the proximity of an object. U.S. Pat. No. 5,247,261 teaches the use of an electric field responsive sensor to measure the position of a point with respect to at least one axis. U.S. Pat. No. 5,411,289 teaches the use of a capacitive sensor incorporated into the back rest of the seat to detect occupant presence. U.S. Pat. No. 5,525,843 teaches the use of electrodes incorporated into the base and back of the seat for purpose of detecting the presence of an occupant, whereby the electrodes are substantially insulated from the vehicle chassis when the detection circuit is active. U.S. Pat. No. 5,602,734 teaches an array of electrodes mounted above the occupant for purposes of sensing occupant position based upon the influence of the occupant on the capacitance amongst the electrodes.

The prior art teaches systems—used alone or in combination—for suppressing the passenger air bag in dangerous situations. These systems incorporate various sensing technologies, for example:

Active infra-red sensors

Passive infra-red sensors (heat detectors)

Ultrasonic sensors

Capacitive sensors

Weight sensors (including various sensor technologies and measurement methods)

Child seat "tag" sensors

Vision-based systems

An objective of these sensors is to determine when an occupant is very close to the inflator door and in the path of the deploying air bag, particularly out-of-position occupants and rear facing infants. Once detected, these systems need to employ the correct airbag deployment strategy such that the passenger side airbag is disabled when a rear facing infant seat is present, or when a person is within a specified region near the inflator door at the time a crash occurs. A complicating situation for the sensor is when there is an object, but no part of the occupant in the at-risk zone. Usually the air bag could still be beneficial for the occupant, especially if the object in the at-risk zone is a low density or low mass object like a newspaper or a map. Systems that only use ultrasonic and optical sensing mechanisms can be blocked by newspapers. Ultrasonic sensors in some configurations will be affected by environmental conditions (temperature, humidity, altitude) because the speed of sound changes depending on the environment. Any sensing system that needs a clear line of sight between the sensor and the occupant requires the sensor to be visible to the occupant.

Radar systems can be used to measure the range to an object; however, there is a perception that biological tissue may be adversely affected by the continuous exposure thereof to a radar beam.

Usually two or more of these sensors are used together in an attempt to identify child seats, small occupants, empty seats, large occupants and out-of-position occupants. The more sensors that are used, the better the chance for a high performance system. The costs of systems that use many sensors however, can become prohibitively high because of the large number of components and the increased assembly complexity of the vehicle.

Sensors which measure the distance between a point of reference and the surface of an object, such as ultrasonic or infrared beam sensors, are also vulnerable to false measurements, as would be caused for example by the presence of the extremities of an occupant, or by the presence of an object such as a scarf or newspaper held thereby, in proximity to the sensor. These types of sensors could be used to monitor the at-risk zone proximate the inflator door, but are subject to several disadvantages. In particular, infrared based systems usually incorporate a beam much narrower than the volume of the at-risk zone such that multiple beams may be required to reliably sense an object anywhere inside the at-risk zone. The incorporation of multiple beams results in extra cost, complexity, and potentially slowed response. Furthermore, both infrared beam and ultrasonic base sensors would require a significant amount of hardware proximate the inflator door if the at-risk zone proximate the inflator is to be monitored.

One disadvantage of many occupant detection systems is that they do not gather the most relevant information to determine if the occupant is in an at-risk zone around the inflator module. Occupant detection systems that are mounted above the passenger and look down on the seat area have the wrong physical perspective to directly monitor the region around the inflator door. Even if an ideal set of roof mounted sensors can reliably determine the occupant's gross position—which is a very challenging task,—the actual volume between the inflator door and the occupant may be blocked to the sensors by the occupant's body. If the criteria for controlling the activation of an air bag inflator were in part based on the proximity of the occupant's body to the air bag inflator door, then overhead sensors simply cannot reliably obtain the relevant information. Systems that only use ultrasonic and optical sensing mechanisms can be blocked by newspapers. Ultrasonic sensors in some configurations will be affected by environmental conditions (temperature, humidity, altitude) because the speed of sound changes depending on the environment. Any sensing system that needs a clear line of sight between the sensor and the occupant requires the sensor to be visible to the occupant.

Some prior-art occupant detection systems attempt to identify the type of occupant or object in the passenger side seat, for example to discriminate a rear facing infant seat from a normally seated adult in the passenger seat. However, this is generally a very challenging task as there are a large variety of possible situations. Sensor systems that depend upon distance measurements to identify occupant situations generally use information from a relatively small number of points in space for identifying the particular type of occupant in the seat from amongst many possibilities. Results from these systems can be unreliable because a particular situation can be significantly changed by simple and common acts such as tossing a blanket over the occupant. Systems than can distinguish the occupant situation may be limited by the inability to disable the air bag during a pre-impact breaking event. Moreover, the algorithms used in those systems are sometimes so complex that performance is sometimes unpredictable. While complex algorithms can sometimes makeup for the lack of direct sensory information, the same algorithms can sometimes create performance anomalies.

SUMMARY OF THE INVENTION

The instant invention overcomes the above-noted problems by providing a radar-based range finding system, the activation of which is responsive to a continuously active activation sensor, to suppress an air bag if an occupant is too close to the air bag inflator door after a vehicle crash has started. The continuously active activation sensor comprises either a crash sensor or a range/proximity occupant sensor, and the radar-based range finding system is in communication therewith. The instant invention detects a human body part that is within the at-risk zone of the air bag inflator at the time of impact such that the air bag can be disabled or its inflation rate can be reduced.

Air bags can be hazardous to forward facing occupants that are too close to the air bag inflator at the time of vehicle impact, as for example can occur when an unbelted occupant is exposed to severe pre-impact braking. To be effective, the sensor must detect the presence of the passenger near the air bag inflator within sufficient time so as to disable the air bag while the passenger is still "flying" through the air during this pre-impact braking event.

The radar sensor incorporated in the instant invention is fast enough to identify an occupant's position within several milliseconds. However, one disadvantage of a radar sensor to which occupants are exposed is the potential detrimental effects—either real or perceived—from exposure to the corresponding electromagnetic radiation. Consumers, and therefore automobile manufacturers, may hesitate to use a radar inside an automobile because of the perception of possible negative health effects, notwithstanding the lack of evidence that a low power radar would have any biological effect.

Accordingly, one object of the instant invention is to provide an improved occupant detection system, which when incorporated into an occupant restraint system, reduces the risk of injury to occupants by the associated air bag module.

A further object of the instant invention is to provide an improved occupant detection system that minimizes the exposure of an occupant to RF radiation.

A further object of the instant invention is to provide an improved occupant detection system that can determine if an occupant is positioned within the at-risk zone of the air bag module.

The instant invention provides for several methods and apparatus that could be used alone or together to allow the radar to be inactive until an object is in the at-risk zone or a vehicle is actually in a collision. The instant invention provides for fast communications and an activation feature that keeps the radar off until a signal from the crash sensing air bag control module is received, or until a range/proximity sensor detects an object in the at-risk zone. Upon activation of the radar incorporated in the instant invention, the system provides for disabling the air bag if the occupant is within the at-risk zone in front of the air bag inflator.

The instant invention provides a number of associated advantages, including the following:

1. A radar can penetrate many materials. The depth of penetration depends on the material and the frequency of the radar.
2. The radar may sense a newspaper, but it can also sense objects beyond the newspaper. The radar does not sense objects behind a person's body since the radio frequency energy will be absorbed by the person's body tissue. Thus the radar may be used to determine if the object in the air bag at-risk zone is an object such as a newspaper simply by looking for the occupant behind the newspaper.
3. The radar depends on the speed of light which does not vary significantly over automotive environments.
4. The radar is sufficiently fast to enable the control of a safety restraint system, because the associated range measuring process occurs at the speed of light, and the range data can be sampled at relatively high frequencies.
5. There are no moving parts in a radar.
6. The mechanism used in the radar is not sensitive to mechanical alignments, as are optical range finding systems that are calibrated based upon the mechanical position of associated imaging optics.
7. The radar can be hidden behind the trim pieces since it can transmit through thin sheets of plastic.
8. In one embodiment, because the activation of the radar is responsive to the crash in accordance with a communications path between the radar module and the frontal crash sensing unit, the radar remains inactive until a crash actually starts. Accordingly, there should be no threat, real or even perceived, of any biological effects due to the radar since it doesn't run until a crash actually begins. When it does run, the power density of the RF energy is well below conservative industry or government power density limits. The vehicle acceleration information can also be obtained by the radar module by using an on-board accelerometer, but preferably this information is relayed by high speed communications between the radar and the air bag control module, wherein the air bag control module controls when the air bags are deployed and accordingly knows when the occupant position measurement from the radar module is needed.

9. The instant invention also provides for the combination of sensors to make an assessment of whether there is an occupant in the at-risk zone near the inflation module. A range/proximity sensor using ultrasonic, active IR, passive IR, capacitive sensing, vision, or inductive sensing technologies is used to constantly monitor the at-risk zone. When an object is detected within the at-risk zone by the range/proximity sensor, the radar is turned on to determine the type of object, for example such as a person, or a person holding a newspaper or map.

10. The use of a radar along with a capacitive or inductive sensing technologies allows the system to robustly distinguish between newspapers and occupants in the at-risk zone.

These and other objects, features, and advantages of the instant invention will be more fully understood after reading the following detailed description of the preferred embodiment with reference to the accompanying drawings and viewed in accordance with the appended claims.

BRIEF DESCRIPTION OF THE DRAWINGS

FIG. 2 illustrates a block diagram of occupant detection system logic in accordance with the first embodiment;

FIG. 6 illustrates a block diagram of occupant detection system logic in accordance with the third embodiment;

DETAILED DESCRIPTION OF THE PREFERRED EMBODIMENT(S)

Figure 1:
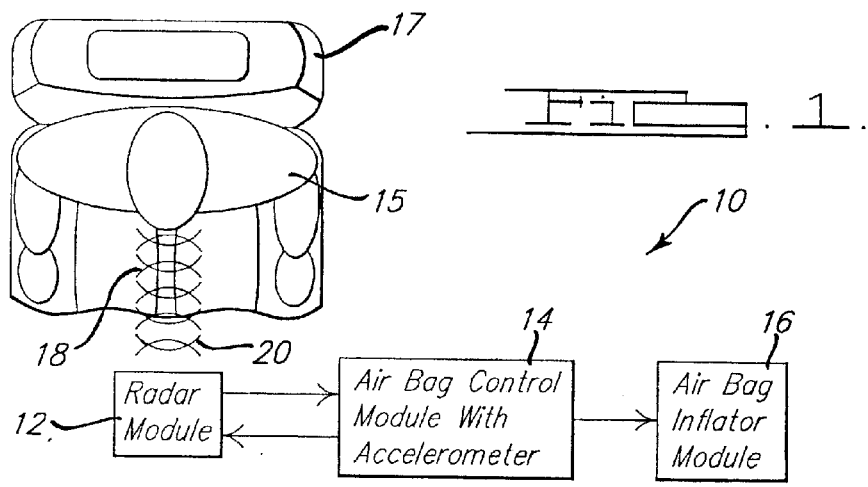
FIG. 1 illustrates a block diagram of the instant invention in accordance with a first embodiment.

Referring to FIG. 1, an occupant detection system 10 comprises a radar module 12 that can scan a distance range between 0 and approximately 1.5 meters many times in approximately 5 milliseconds. The radar module 12 preferably operates at a frequency that allows it to penetrate a newspaper while still using a low average power, for example between 1 GHz and 100 GHz. The lower frequencies in that range are preferable because they transmit through thick newspapers more efficiently than the higher frequencies. An algorithm is provided for determining from the radar scan whether a human body part is near the air bag inflator module 16. This includes the ability to differentiate an object such as a newspaper from the occupant's body so that the air bag is not disabled by an object such as a newspaper being in the at-risk zone. The radar module 12 measures the distance to an occupant 15 by any one of a number of known techniques including time of flight; phase shift; or frequency shift, as in linear frequency modulate continuous wave (LFMCW) radar; using either pulsed or continuous wave electromagnetic radiation wherein transmitted waves 18 from the radar module 12 are reflected by a reflective surface and returned as reflected waves 20 to the radar module.

The occupant detection system 10 further comprises an activation sensor for controlling the activation of the radar module 12 responsive to the likelihood of a vehicle being in a crash, or to an occupant being positioned so as to be at risk of injury from a deploying air bag.

In accordance with a first embodiment of the instant invention, a dedicated high speed communications link is established between the radar module 12 and the air bag control module 14. Upon sensing a high acceleration in the frontal direction (typically around 1 g or above), the air bag control module 14 recognizes the possibility of the vehicle being in a crash and communicates this to the radar module 12. For example, if the vehicle acceleration exceeds a threshold, as for example might be detected by a crash safing sensor, then the radar module 12 is activated. The high speed communications link may be either a direct connection, for example using wire or fiber optic cable; or a wireless connection, for example using radio frequency or optical beam electromagnetic radiation. Once the radar module 12 makes the determination of occupant position, and the radar module 12 identifies that the occupant 15 is positioned so as to not be in danger of injury from the air bag inflator module 16, the radar module 12 communicates an enable signal to the air bag control module 14. The communications must be immune to electromagnetic interference and fast enough to allow changes of state in well under 1 millisecond. The air bag inflator module is disabled either if the radar module 12 detects the vehicle seat 17 as the closest object—thereby assuming the seat to be empty—or if the radar module 12 detects an occupant 15 within the at-risk zone of the air bag inflator module 16. There are many possible communications schemes.

The occupant detection system 10 may further comprise a range/proximity sensor 22 that determines if the occupant is within a predetermined at-risk zone proximate to the air bag inflator module 16. The range/proximity sensor 22 uses capacitive, ultrasonic, optical (including active or passive infrared, or vision based systems), inductive or radar technologies. Preferably, the range/proximity sensor 22 is adapted for distinguishing people or animate objects from inanimate objects, as for example is possible in many cases with capacitive or passive infrared sensors.

The radar module 12 is mounted in the vehicle such that it can sense objects in front of the air bag inflator module 16 and sense the occupant or other surfaces a significant distance beyond the at-risk zone region in front of the air bag inflator module 16. The range/proximity sensor 22 is also be mounted such that it can sense objects in front of the air bag inflator module 16. An object in the at-risk zone region in front of the air bag inflator module 16 would be sensed by both the radar module 12 and the range/proximity sensor 22.

The radar module 12 when activated senses the region in front of the air bag inflator module 16. A fast two-way communications link is provided between the radar module 12 and the air bag control module 14. The air bag control module 14 incorporates an on-board accelerometer to determine when the vehicle is in a crash, and communicates the occurrence of a crash to the radar module 12 using the two-way communications link.

The air bag control module 14 senses the acceleration of the vehicle in the forward direction. In even the highest speed frontal crashes that require the air bag, there is always a time period between the "first hint of a crash" from the control module accelerometer and the air bag's required "time to fire." The first hint of a crash is when the accelerometer sees an acceleration level not seen during non-crash driving, possibly 1 to 3 g. This time period is used by the control module algorithm to determine if the crash is severe enough to require an air bag, and is referred to hereinafter as the "minimum pre-crash interval". The minimum delay ("time to fire") is dependent on the vehicle and air bag inflator module 16 design and is usually greater than about 8 milliseconds. During the minimum pre-crash interval, the radar module 12 can be activated and make a determination if the occupant is within the air bag module's at-risk zone.

Referring to FIG. 2, the associated system logic (100) is as follows:

a. If in step (104) from step (102) there is no hint of a crash from the air bag control module 14, then the radar module 12 remains inactive.

b. If in step (104) there is a hint of a crash, then in step (106) the air bag control module 14 communicates this to the radar module 12, causing the radar to be activated so as to determine in step (108) if there is an occupant in the at-risk zone of the air bag inflator module 16 and communicate this information to the air bag control module 14 within the minimum pre-crash interval.

i) If in step (110) there is an occupant in the at-risk zone, then the radar module 12 communicates this to the air bag control module 14, causing the air bag control module 14 to be disabled in step (112).

ii) If in step (110) there is no occupant in the at-risk zone, the radar module 12 communicates this to the air bag control module 14, so as to enable the air bag control module 14 in step (114), and continues in step (116) to look for an occupant in the at-risk zone for an extended period of time, possibly several seconds. If during this extended monitoring time period, the radar module 12 senses an occupant in the at-risk zone, this information is communicated to the air bag control module 14, causing the air bag control module 14 to be disabled in step (112). Otherwise, after the extended period of time, the radar module 12 is deactivated in step (118).

c. If in step (122) from step (102) the crash sensing system in the air bag control module 14 detects a crash for which an air bag inflator is required, and if in step (124) the air bag control module 14 is enabled, then in step (126) the air bag control module 14 is activated, possibly responsive (128) to the range measurement form the radar module 12.

Figure 3:
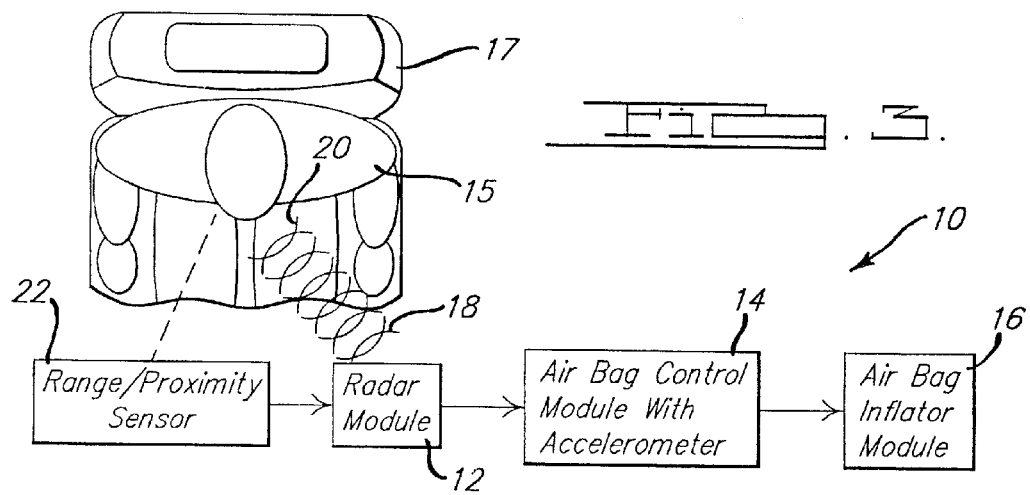
FIG. 3 illustrates a block diagram of the instant invention in accordance with a second embodiment.

Referring to FIG. 3 illustrating a second embodiment of the instant invention, when activated, the radar module 12 senses a region proximate to the air bag inflator module 16 with a range/proximity sensor 22 as described hereinabove.

The two sensors are used together to accurately determine if any occupant is in the at-risk zone of the air bag inflator. The radar module 12 remains inactive until an object is sensed by the range/proximity sensor 22, after which the radar module 12 becomes active and determines if the object in the at-risk zone is part of an occupant.

Figure 4:
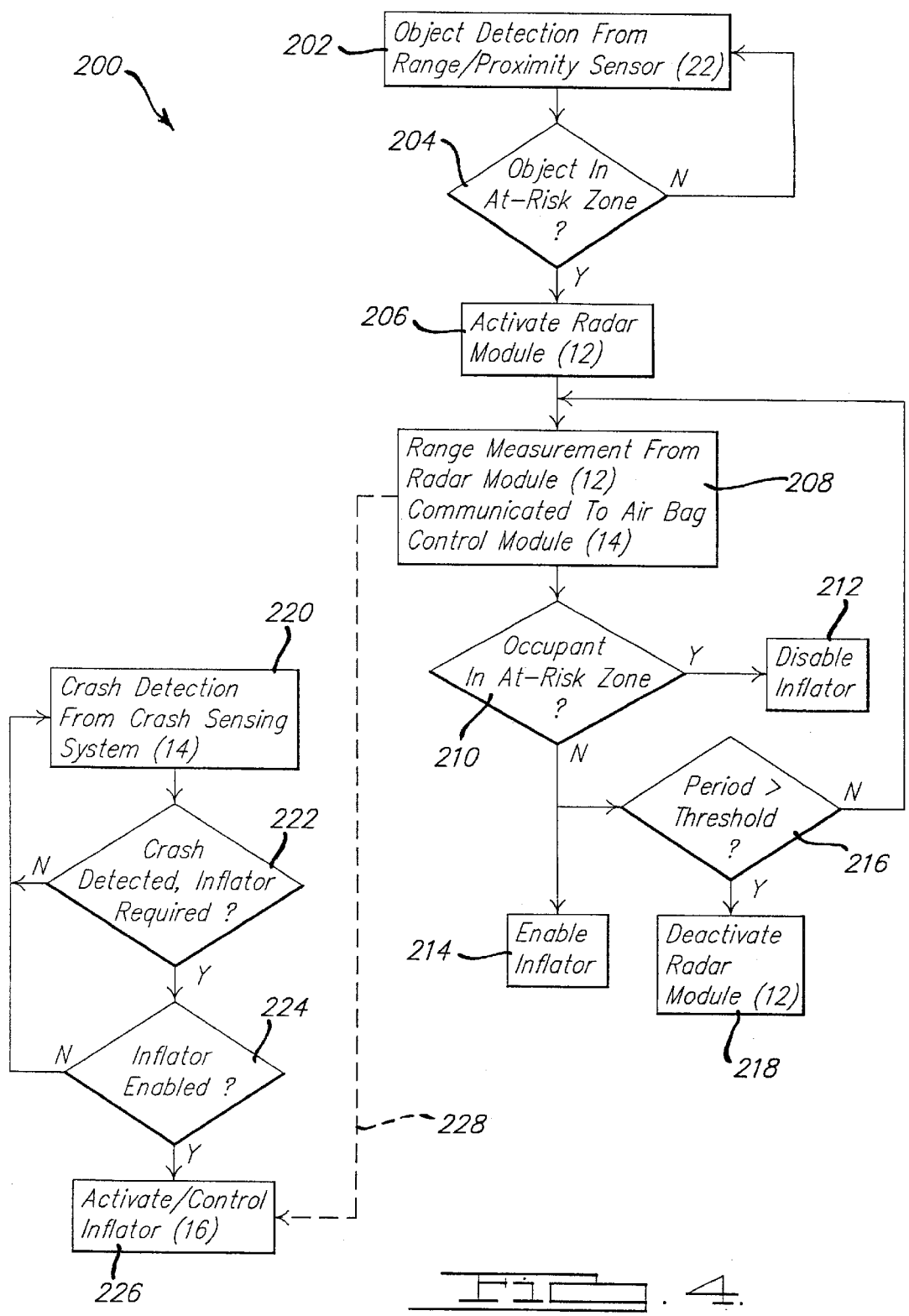
FIG. 4 illustrates a block diagram of occupant detection system logic in accordance with the second embodiment.

Referring to FIG. 4, the associated system logic (200) is as follows:

a. If in step (204) from step (202) the range/proximity sensor 22 does not sense an object in the at-risk zone of the air bag inflator module 16, then the radar module 12 remains inactive.

b. If in step (204) the range/proximity sensor 22 senses an object in the at-risk zone of the air bag inflator module 16, then in step (206) the radar module 12 is activated so as to determine in step (208) if there is an occupant in the at-risk zone of the air bag inflator module 16.

i) If in step (210) there is an occupant in the at-risk zone, then the radar module 12 communicates this to the air bag control module 14, causing the air bag control module 14 to be disabled in step (212).

ii) If in step (210) there is no occupant in the at-risk zone, the radar module 12 communicates this to the air bag control module 14 in step (214), and continues in step (216) to look for an occupant in the at-risk zone for an extended period of time, possibly several seconds. If during this extended monitoring time period, the radar module 12 senses an occupant in the at-risk zone, this information is communicated to the air bag control module 14, causing the air bag control module 14 to be disabled in step (212). Otherwise, after the extended period of time, the radar module 12 is deactivated in step (218).

c. If in step (222) from step (220) the crash sensing system in the air bag control module 14 detects a crash for which an air bag inflator is required, and if in step (224) the air bag control module 14 is enabled, then in step (226) the air bag control module 14 is activated, possibly responsive (228) to the range measurement form the radar module 12.

In accordance with another arrangement of the activation sensor, the radar module 12 may incorporate an accelerometer that detects the possibility of an air bag deployment, however this arrangement is less preferable because of a potential time delay between the high accelerations sensed at the air bag control module 14 and those at the radar module 12.

Figure 5:
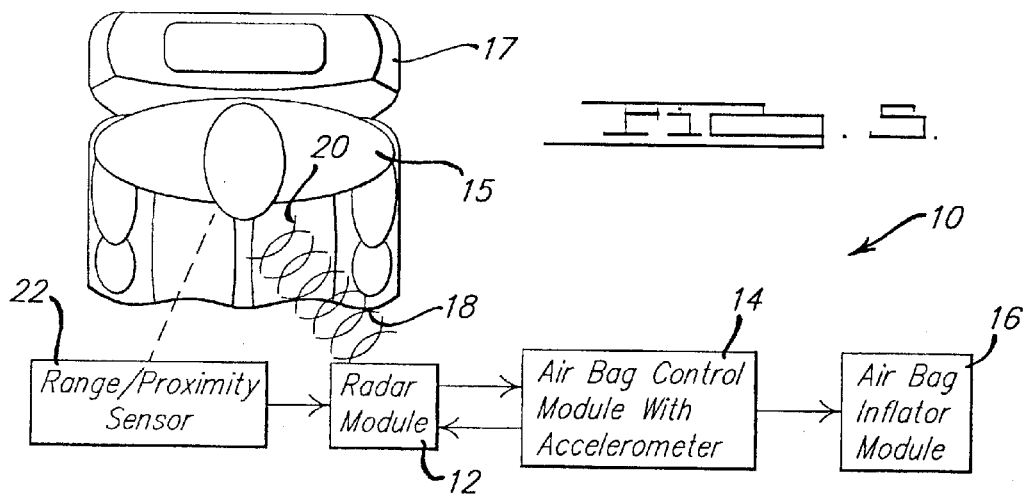
FIG. 5 illustrates a block diagram of the instant invention in accordance with a third embodiment.

Referring to FIG. 5 illustrating a third embodiment of the instant invention that is essentially a combination of the first two embodiments, the radar module 12 is inactive until the air bag control module 14 detects a hint of a crash or the range/proximity sensor 22 senses an object in the at-risk zone of the air bag inflator module 16. When activated, the radar module 12 senses the region proximate to the air bag inflator module 16.

The two sensors are used together to accurately determine if any occupant is in the at-risk zone of the air bag inflator module 16. If an object is sensed by the range/proximity sensor 22, the radar module 12 is activated and determines if the object in the at-risk zone is part of an occupant.

A fast two-way communications link is provided between the radar module 12 and the air bag control module 14. The air bag control module 14 incorporates an on-board accelerometer to determine when the vehicle is in a crash, and communicates the occurrence of a crash to the radar module 12 using the two-way communications link.

Referring to FIG. 6, the associated system logic (300) is as follows:

a. If in step (303) from step (301) the range/proximity sensor 22 does not sense an object in the at-risk zone of the air bag inflator module 16, and if in step (304) from step (302) there is no hint of a crash from the air bag control module 14, then the radar module 12 remains inactive.

b. If in step (303) the range/proximity sensor 22 senses an object in the at-risk zone of the air bag inflator module 16, or if in step (304) there is a likelihood of a crash, then in step (306) the radar module 12 is activated so as to determine if there is an occupant in the at-risk zone of the air bag inflator module 16.

i) If in step (310) from step (308) there is an occupant in the at-risk zone, then the radar module 12 communicates this to the air bag control module 14, causing the air bag control module 14 to be disabled in step (312).

ii) If in step (310) there is no occupant in the at-risk zone, the radar module 12 communicates this to the air bag control module 14 in step (314), and continues in step (316) to look for an occupant in the at-risk zone for an extended period of time, possibly several seconds. If during this extended monitoring time period, the radar module 12 senses an occupant in the at-risk zone, this information is communicated to the air bag control module 14, causing the air bag control module 14 to be disabled in step (312). Otherwise, after the extended period of time, the radar module 12 is deactivated in step (318).

d. If in step (322) from step (302) the crash sensing system in the air bag control module 14 detects a crash for which an air bag inflator is required, and if in step (324) the air bag control module 14 is enabled, then in step (326) the air bag control module 14 is activated, possibly responsive (328) to the range measurement from the radar module 12.

In accordance with the instant invention, an algorithm is provided that determines from the radar scans if the object near the air bag inflator is a large, dense object such as a person's head or torso, or a low density object such as a newspaper. One fairly simple algorithm uses the fact that radar can penetrate through newspapers. While the radar is reflected from the newspaper, part of the signal is also transmitted through the newspaper. The transmitted part of the signal will reflect off the next target and the radar will see two objects. If the object in the at-risk zone is a person, the radar signal does not transmit through the person's body, resulting in only a single detected target.

Accordingly, if the radar senses only a single target in the at-risk zone, then the target is large enough to absorb the radar's RF energy and it would be assumed that the target is a person's head or torso. If the radar senses multiple objects, with at least one being beyond the at-risk zone, then the object in the at-risk zone is not a head or torso and it is assumed that the occupant's head or torso are outside of the at-risk zone.

In accordance with the second and third embodiments, the range/proximity sensor 22 is used to trigger the radar module 12 when there is an object detected in the at-risk zone. In order for this to be effective, the range/proximity sensor 22 must be sufficiently fast so the delay between the time the object penetrates the at-risk zone and the time the radar module 12 is activated is sufficiently small (preferably less than 2 milliseconds.) Active IR sensors that use the position of an imaged spot of light can be sufficiently fast because the actual position of the spot is effectively updated in a few nanoseconds. Capacitive sensors can also be sufficiently fast.

Ultrasonic sensors have an inherent delay because the speed of sound is approximately 13 inches per millisecond. If the distance to be measured extends only to about 8 inches, this does not present an unusable delay. If, however, the ultrasonic sensor must wait for the pulse to be reflected from its furthest possible distance, the delay can become over 10 milliseconds. There are several ways to minimize this delay.

One method is to use two ultrasonic transducers. One transducer sends out the ultrasonic beam that is continuously swept in frequency, for example a chirped signal. The second transducer is simply listening for the reflected beam. Every distance will have a known frequency shift between the frequency "currently" being sent out and the frequency "currently" being received. This frequency modulation concept is used in radar systems. Another method is to send out a pulse from a single transducer as soon as the previous pulse is received.

A capacitive sensor has several advantages as the range/proximity sensor 22. The advantages include:

1. Like the radar, the capacitive sensor can also be hidden from the occupant by the plastic on the surface of the instrument panel.
2. The capacitive sensor is relatively immune to sensing newspaper type objects or any objects that are poorly coupled to ground. This characteristic is helpful when condensation or another isolated radar reflector is within the at-risk zone.
3. The capacitive sensor's lack of a highly accurate absolute range measurement and insensitivity to newspapers compliments the radar's ability to measure range and sense a newspaper.
4. One problem with a capacitive sensor is that small changes in the sensor's offset may be large enough to inadvertently indicate that an occupant is at the outer envelope of the capacitive sensor's range. If the radar is activated because of this offset drift, the radar can determine if there is an object within the at-risk zone. If there is no object in the at-risk zone, the capacitive sensor's threshold can be adjusted to a new "no target" level.

The radar module 12 and the range/proximity sensor 22 can be placed in a variety locations in accordance with the various embodiments described hereinabove. In one location, the sensors are mounted on top of, or as close as possible to, the air bag inflator module door. The sensors sense in the direction of the air bag deployment since that is the most dangerous region. The sensors may also be located off to the side of the air bag inflator module 16 and so as to sense across the region in front of the air bag inflator. The sensor beams may also be located so as to cross in front of the air bag inflator parallel to the face of the air bag inflator door.

Figure 7:
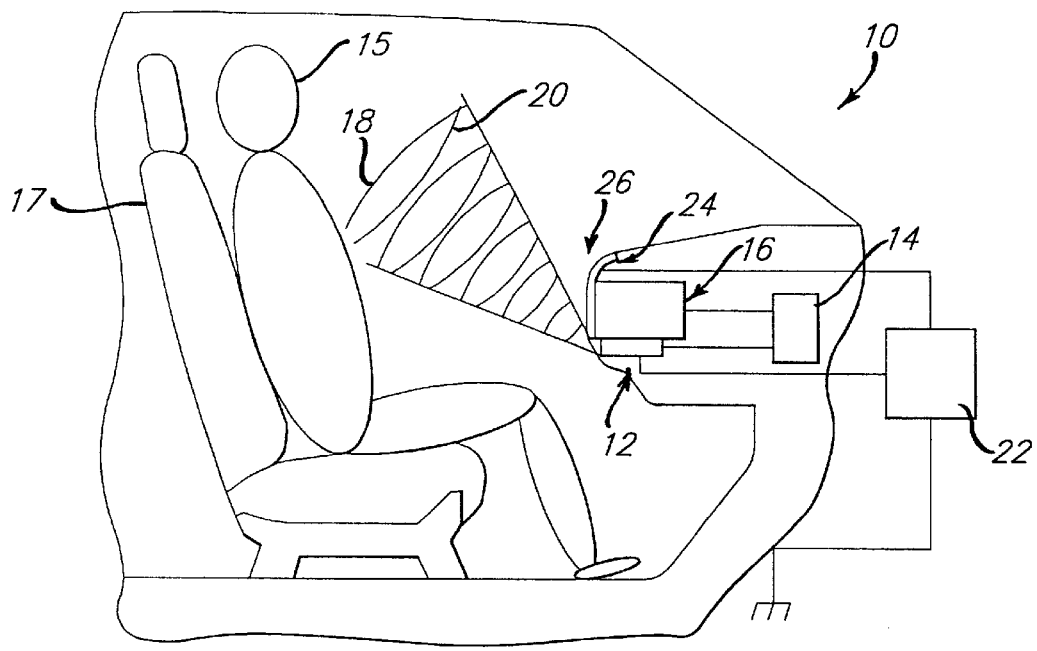
FIG. 7 illustrates the instant invention in accordance with a first arrangement of the associated sensor elements.

Referring to FIG. 7, the radar module 12 is located below the air bag inflator module 16 and observes the occupant 15 through the instrument panel trim. The range/proximity sensor 22 comprises a capacitive sensor with a capacitive sensing electrode 24 incorporated in the door 26 of the air bag inflator module 16.

Figure 8:
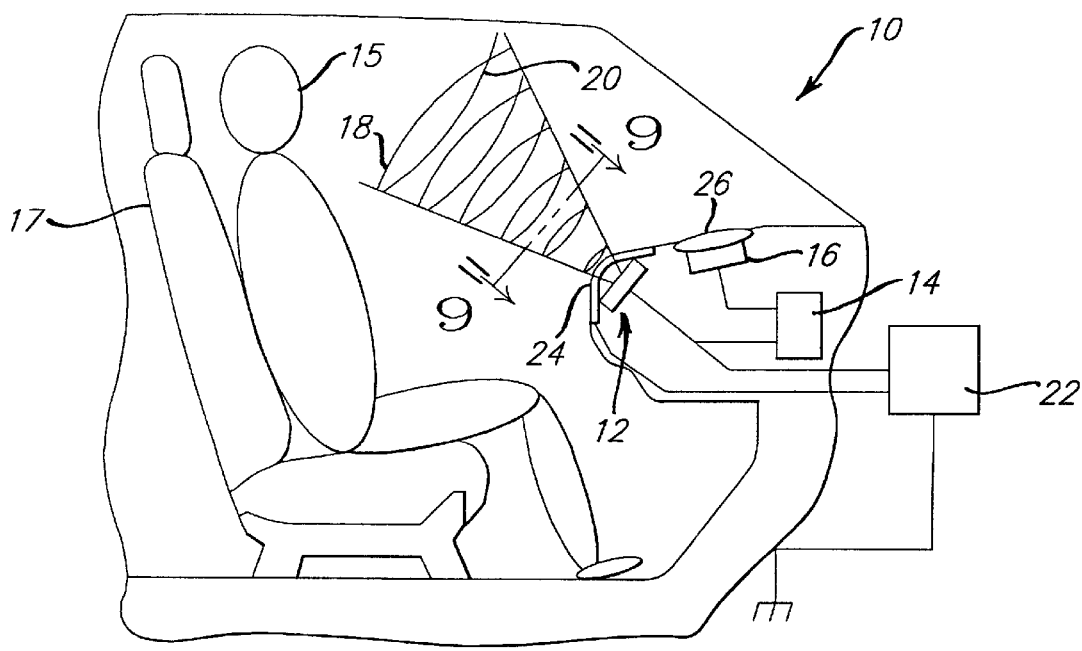
FIG. 8 illustrates the instant invention in accordance with a second arrangement of the associated sensor elements.
Figure 9:
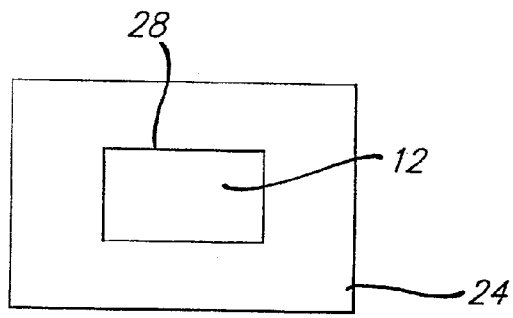
FIG. 9 illustrates an electrode of a range/proximity sensor in accordance with the arrangement illustrated in FIG. 8.

Referring to FIGS. 8 and 9, the radar module 12 is at a separate location from the air bag inflator module 16 and observes the occupant 15 through the an orifice 28 in a capacitive sensing electrode 24 incorporated in the instrument panel.

Figure 10:
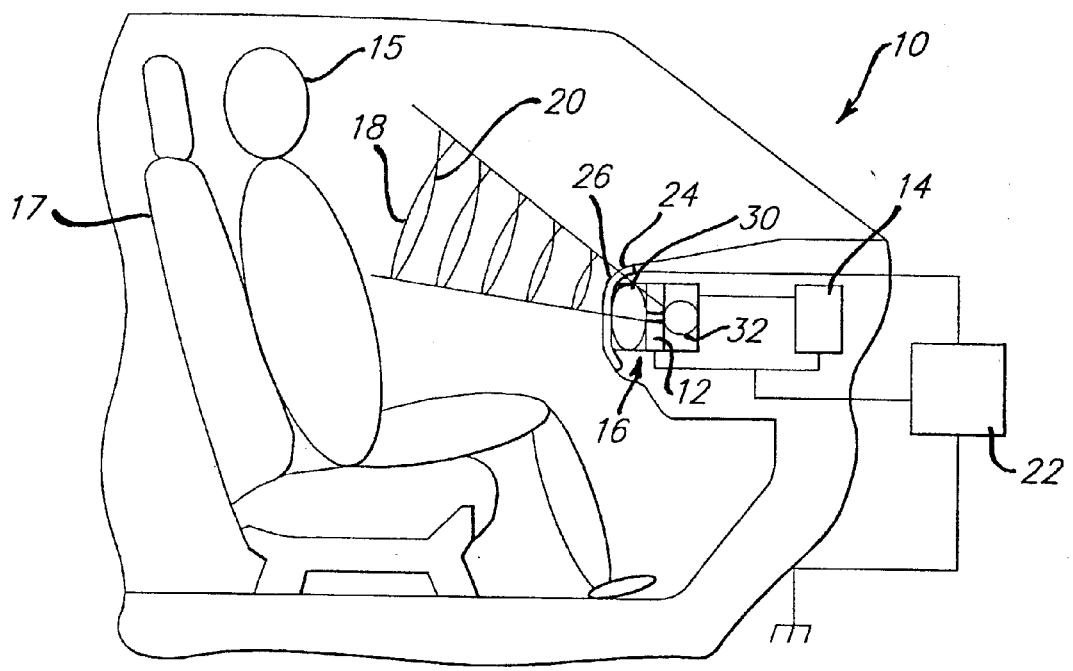
FIG. 10 illustrates the instant invention in accordance with a third arrangement of the associated sensor elements.

Referring to FIG. 10, the radar module 12 is incorporated in the air bag inflator module 16 and observes the occupant 15 through the air bag 30 of the air bag inflator module 16. The air bag inflator module 16 comprises a gas generator 32 for deploying the air bag 30.

One of ordinary skill in the art will appreciate that the instant invention can be utilized with other types of safety restraint systems, besides air bag inflators, that are amenable to controllable actuation. Furthermore, the associated radar module 12 may be located anywhere from which the position of an occupant can be detected so as to determine if the occupant is at risk of injury from the safety restraint system. Yet further, the range/proximity sensor 22 can comprise any kind of non-radar sensor that senses the proximity of an occupant to the at-risk zone of the safety restraint system.

In accordance with the first and third embodiments of the instant invention, the activation sensor for activating the radar module 12 could comprise any kind of sensor that anticipates a crash, including for example a crash acceleration sensor as described hereinabove; a predictive collision sensor for example using microwave, optical, ultrasonic radar sensors directed outside the vehicle, or a braking sensor. The activation sensor may be susceptible to false activations—as would occur from a braking sensor—without causing any adverse consequences.

Furthermore, the radar module 12 and activation sensor may be adapted so that the radar module 12 is always active, but at a duty cycle or sampling rate that is responsive to the activation sensor. Accordingly, for example, the radar module 12 can be turned on for an interval of sufficient length, for example 2 msec, to make a range measurement, and then remain off for a period of time depending upon whether the activation sensor is activated. For example, if the activation sensor were not activated, then the dwell time of the radar module 12 would be 200 msec, whereas if the activation sensor were activated, radar module 12 would be operated continuously. Accordingly, the radar module 12 provides a continuous measure of occupant position, the effective sampling rate of which is increased when a crash is anticipated. This provides for reduced exposure of occupants to microwave energy than if the radar module 12 were continuously activated at the maximum duty cycle.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A method of detecting an occupant in a vehicle and for controlling the actuation of a safety restraint system responsive thereto, comprising:
   a. detecting a condition for which the safety restraint system should not be deployed, wherein the operation of detecting a condition for which the safety restraint system should not be deployed comprises sensing the proximity of an occupant to a region within which said occupant is at risk of injury by the safety restraint system;
   b. controlling the activation of a sensor for sensing the position of an occupant responsive to said operation of detecting a condition for which the safety restraint system should not be deployed; and
   c. controlling the safety restraint system responsive to the sensed position of said occupant.

2. A method of detecting an occupant in a vehicle and for controlling the actuation of a safety restraint system responsive thereto in claim 1, wherein the operation of sensing the proximity of an occupant to said region comprises sensing the occupant.

3. A method of detecting an occupant in a vehicle and for controlling the actuation of a safety restraint system responsive thereto as recited in claim 2, wherein the operation of sensing the proximity sensor selected from the group consisting of a capacitive sensor, a vision sensor, and a passive infrared sensor.

4. A method of detecting an occupant in a vehicle and for controlling the actuation of a safety restraint system responsive thereto, comprising:
   a. sensing with a first sensor the proximity of an occupant to a region within which said occupant is at risk of injury by the safety restraint system;
   b. if said occupant is in proximity to a region so as to be at risk of injury by the safety restraint system, then in response to said proximity of said occupant, sensing with a second sensor that is normally inactive the position of said occupant;
   c. communicating said position to a controller for controlling the safety restraint system; and
   d. controlling the safety restraint system responsive to said position, wherein if said position corresponds to a position for which said occupant is at risk of injury by the safety restraint system, then reducing the power of the safety restraint system.

5. A method of detecting an occupant in a vehicle and for controlling the actuation of a safety restraint system responsive thereto as recited in claim 4, wherein the operation of reducing the power of the safety restraint system comprises disabling the safety restraint system.

6. A method of detecting an occupant in a vehicle and for controlling the actuation of a safety restraint system responsive thereto as recited in claim 4, further comprising the operation of disabling said second sensor responsive to a condition selected from the group consisting of the expiration of a period of time and the occurrence of said acceleration being less than a threshold.

* * * * *